(12) United States Patent
Shigenobu et al.

(10) Patent No.: US 8,320,004 B2
(45) Date of Patent: Nov. 27, 2012

(54) IMAGE FORMING APPARATUS AND COMPUTER-READABLE MEDIUM STORING OPERATION CONTROL PROGRAM

(75) Inventors: Dai Shigenobu, Osaka (JP); Yoshifumi Okabayashi, Osaka (JP); Takanori Miyamoto, Osaka (JP)

(73) Assignee: Kyocera Mita Corporation (JP)

( * ) Notice: Subject to any disclaimer, the term of this patent is extended or adjusted under 35 U.S.C. 154(b) by 528 days.

(21) Appl. No.: 12/557,613

(22) Filed: Sep. 11, 2009

(65) Prior Publication Data

US 2010/0067045 A1   Mar. 18, 2010

(30) Foreign Application Priority Data

Sep. 12, 2008   (JP) ................................. 2008-235430

(51) Int. Cl.
*G06F 3/12* (2006.01)
*G06G 3/00* (2006.01)

(52) U.S. Cl. ........ 358/1.15; 358/1.13; 715/760; 399/81; 399/85

(58) Field of Classification Search .......... 358/1.1–1.18; 399/8, 81, 85; 715/760, 274, 219, 204, 207, 715/234, 273, 275, 705, 710, 738, 744, 747, 715/745
See application file for complete search history.

(56) References Cited

U.S. PATENT DOCUMENTS

| | | | |
|---|---|---|---|
| 5,949,419 A * | 9/1999 | Domine et al. ................ 715/744 |
| 6,314,249 B1 * | 11/2001 | Lay et al. ........................ 399/11 |
| 6,628,413 B1 * | 9/2003 | Lee ............................... 358/1.15 |
| 6,750,878 B1 * | 6/2004 | Tatsuo et al. .................. 715/705 |
| 7,327,478 B2 * | 2/2008 | Matsuda ....................... 358/1.14 |
| 7,487,185 B2 * | 2/2009 | Lomelin-Stoupignan et al. ... 1/1 |
| 7,788,321 B2 * | 8/2010 | Korovkin et al. ............. 709/203 |
| 8,023,137 B2 * | 9/2011 | Yasui et al. ................... 358/1.15 |
| 2005/0105129 A1 * | 5/2005 | Takahashi ..................... 358/1.15 |
| 2006/0056871 A1 * | 3/2006 | Kim ................................. 399/81 |
| 2006/0056873 A1 * | 3/2006 | Kimura ........................... 399/81 |
| 2006/0156229 A1 * | 7/2006 | Morgan ......................... 715/527 |
| 2007/0157304 A1 * | 7/2007 | Logan et al. .................... 726/12 |
| 2008/0028307 A1 * | 1/2008 | Oh ................................. 715/274 |
| 2008/0151301 A1 * | 6/2008 | Ito ................................. 358/1.15 |

FOREIGN PATENT DOCUMENTS

| | | |
|---|---|---|
| JP | 2003-122279 | 4/2003 |
| JP | 2006243346 | 9/2006 |
| JP | 200765726 | 3/2007 |

* cited by examiner

*Primary Examiner* — Twyler Haskins
*Assistant Examiner* — Dennis Dicker
(74) *Attorney, Agent, or Firm* — Gerald E. Hespos; Michael J. Porco

(57) ABSTRACT

An image forming apparatus includes: a display unit that displays an image; a web browser that causes the display unit to display thereon a web page; and an operation setting unit that receives from a user and stores an input of operation settings relating to the operation of the image forming apparatus, and of web page display settings relating to web page display control by the web browser. Upon launching of the web browser, the operation setting unit outputs the web page display settings to the web browser. The web browser displays the web page on the display unit according to the web page display settings.

6 Claims, 15 Drawing Sheets

IMAGE FORMING APPARATUS AND COMPUTER-READABLE MEDIUM STORING OPERATION CONTROL PROGRAM

BACKGROUND OF THE INVENTION

1. Field of the Invention

The present invention relates to an image forming apparatus, an operation control program, and a computer-readable medium which stores an operation control program, and more particularly to a technology for displaying a web page on a display unit.

2. Description of the Background Art

Conventional image forming apparatuses, such as copiers, multifunction machines (devices that combine a copier function, a printer function, a fax function and a scanner function) and the like are provided with display units that comprise, for instance, an LCD (Liquid Crystal Display), in order to display operation guidance to the user. Also, image forming apparatuses have been proposed in which the image forming apparatuses are connected to the internet, and internet web pages can be displayed on the above-mentioned display unit, in addition to the operation guidance.

A main controller, which governs the operation control of the various units of the image forming apparatus, controls the operation of, for instance, an image formation mechanism in the image forming apparatus. Ordinarily, a web browser is responsible for controlling the display of a web page on the display unit. Operation settings for operating the various units of the image forming apparatus are received and stored by the main controller, while settings such as port settings for internet connection and font size settings for display of web pages on the display unit are inputted by the user, item by item, and are received and stored by the web browser.

SUMMARY OF THE INVENTION

The present invention makes further improvements on the above-described conventional technology.

Specifically, the present invention is an image forming apparatus, comprising a display unit that displays an image; a web browser function unit that causes the display unit to display thereon a web page; and an operation setting unit that receives from a user and stores an input of operation settings relating to the operation of the image forming apparatus, and of web page display settings relating to web page display control on the display unit by the web browser function unit; wherein upon start-up of the web browser function unit, the operation setting unit outputs the web page display settings to the web browser function unit, and the web browser function unit controls the display of a web page on the display unit according to the web page display settings.

These and other objects, features and advantages of the present invention will become more apparent upon reading of the following detailed description along with the accompanied drawings.

DETAILED DESCRIPTION OF THE PREFERRED EMBODIMENTS

Figure 1:
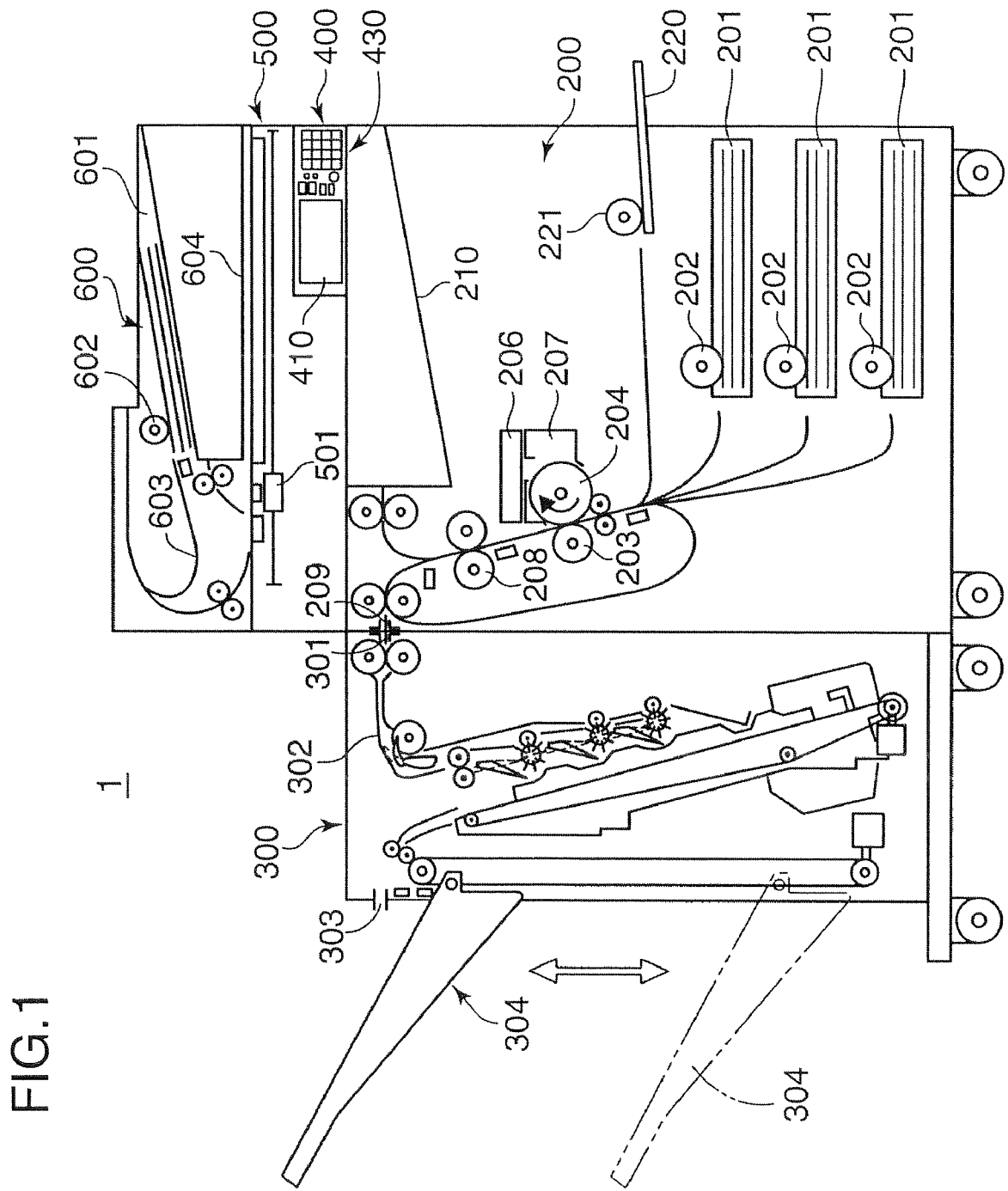
FIG. 1 is a side-view schematic diagram illustrating the configuration of a multifunction machine as an embodiment of an image forming apparatus comprising a display control device according to the present invention.

An embodiment of an image forming apparatus comprising a display control device according to the present invention will be explained below. FIG. 1 is a side-view schematic diagram illustrating the configuration of a multifunction machine as an embodiment of an image forming apparatus comprising a display control device according to the present invention.

A multifunction machine 1 comprises a main body 200; a paper post-processing unit 300 arranged on the paper carry-out side of the main body 200, for instance on the left side; an operation unit 400 through which, for instance, various operation commands are inputted by a user; a document reading unit 500 disposed above the main body 200; and a document feeding unit 600 disposed above the document reading unit 500.

The operation unit 400 comprises a display unit (display means) 410 comprising, for instance, an LCD (Liquid Crystal Display), and an operation key unit 430 through which the user inputs operation instructions. The operation key unit 430 comprises, for instance, a start key and a numerical keypad.

The document feeding unit 600 comprises a document placing section 601, a paper feeding roller 602, a document transport unit 603 and a document discharge unit 604. The document reading unit 500 comprises a scanner 501. The paper feeding roller 602 pays out, one by one, a required number of documents set in the document placing section 601. The document transport unit 603 sequentially transports the paid out documents up to a reading position of the scanner 501. The scanner 501 reads sequentially the images of the transported documents, whereupon the read documents are discharged at the document discharge unit 604.

The main body 200 comprises, for instance, a plurality of paper feeding cassettes 201, a plurality of paper feeding rollers 202, a transfer roller 203, a photosensitive drum 204, an exposure device 206, a developing device 207, fixing rollers 208, a discharge port 209 and a discharge tray 210.

The photosensitive drum 204 charges uniformly a charging device (not shown) while rotating in the direction of the arrow. The exposure device 206 scans laser light, modulated in accordance with image data of the document read by the document reading unit 500, onto the photosensitive drum 204, to form an electrostatic latent image on the drum surface. The developing device 207 supplies black developer to the photosensitive drum 204, to form thereby a toner image.

Meanwhile, the paper feeding rollers 202 draw printing paper out of the paper feeding cassettes 201 in which printing paper is stored, and feed the printing paper up to the transfer roller 203. The transfer roller 203 transfers the toner image on the photosensitive drum 204 onto the transported printing paper. The fixing rollers 208 heat the transferred toner image, to fix the latter onto the printing paper. Thereafter, the printing paper is conveyed through the discharge port 209 of the main body 200 into the paper post-processing unit 300. Optionally, the printing paper may also be discharged onto the discharge tray 210.

The paper post-processing unit 300 comprises, for instance, an inlet port 301, a printing paper transport unit 302, an outlet port 303 and a stack tray 304. The printing paper transport unit 302 sequentially transports printing paper conveyed in through the inlet port 301, out of the discharge port 209, and discharges eventually the printing paper onto the stack tray 304 through the outlet port 303. The stack tray 304 is configured to be vertically movable, in the direction of the arrows, in accordance with the number of stacked printing paper sheets conveyed out through the outlet port 303.

Figure 2:
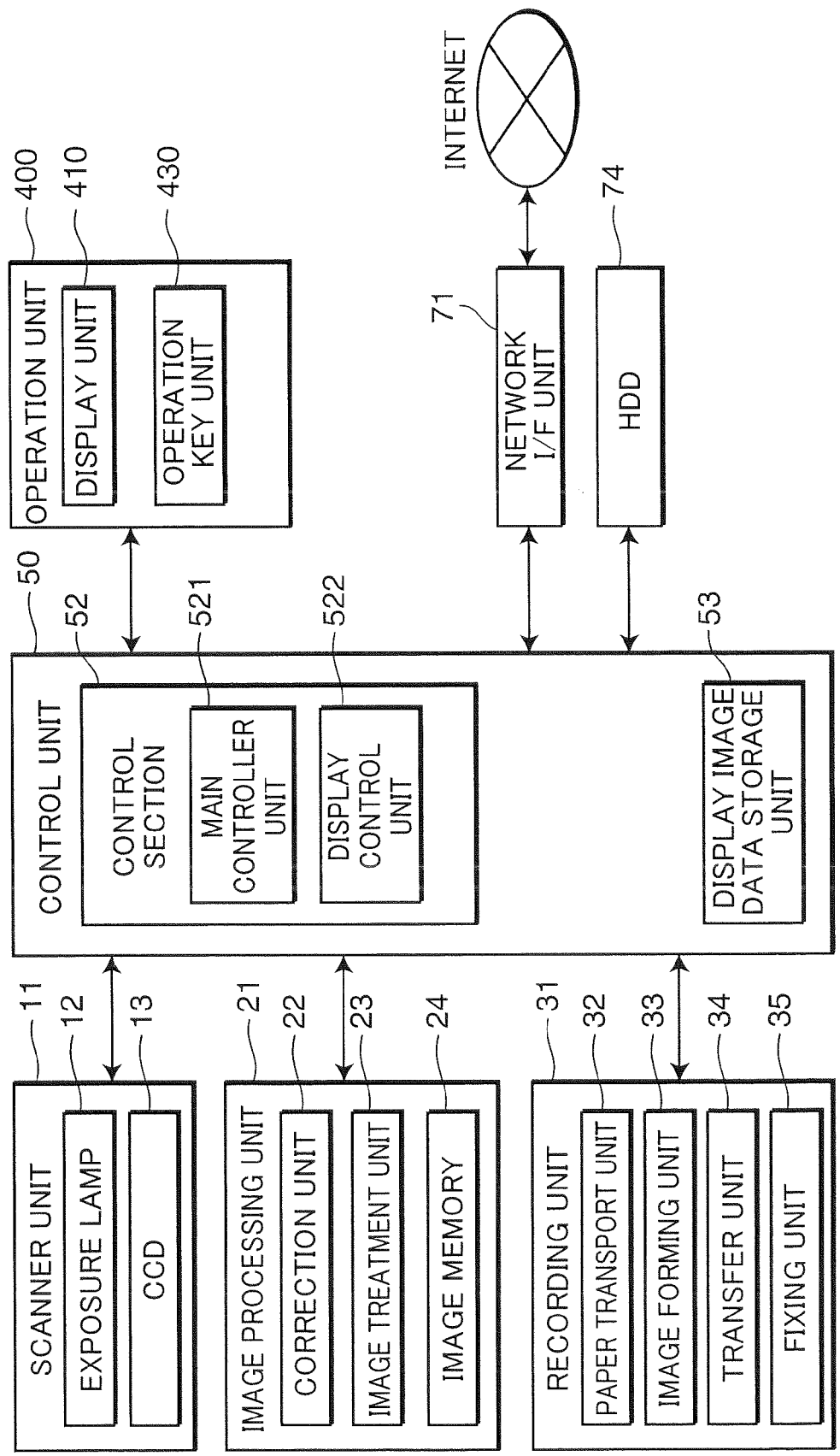
FIG. 2 is a control block diagram of the multifunction machine.

FIG. 2 is a control block diagram of the multifunction machine 1. This multifunction machine 1 comprises a scanner unit 11, an image processing unit 21, a recording unit 31, an operation unit 400, a control unit 50, a network I/F (interface) unit 71 and an HDD (hard disk drive) 74.

The scanner unit 11 comprises an exposure lamp 12 and a CCD (Charge Coupled Device) 13 that make up the scanner 501 in FIG. 1. The exposure lamp 12 irradiates the document and the CCD 13 receives the resulting reflected light, whereby the scanner unit 11 reads an image from the document. The scanner unit 11 outputs image data corresponding to the read image to the image processing unit 21.

The image processing unit 21 comprises a correction unit 22, an image treatment unit 23 and an image memory 24. The image processing unit 21 processes the read image data as necessary, by way of the correction unit 22 and the image treatment unit 23, stores the processed image data in the image memory 24 and outputs the image data to the recording unit 31. The correction unit 22 performs predetermined corrections, such as level correction and γ correction, on the read image data. The image treatment unit 23 performs various treatments on the image data, for instance compression/expansion or enlargement/reduction.

The recording unit 31 comprises a paper transport unit 32 comprising, for instance, the paper feeding cassettes 201 and the paper feeding rollers 202 illustrated in FIG. 1; an image forming unit 33 comprising, for instance, the photosensitive drum 204, the exposure device 206 and the developing device 207 illustrated in FIG. 1; a transfer unit 34 comprising, for instance, the transfer roller 203 illustrated in FIG. 1; and a fixing unit 35 comprising, for instance, the fixing rollers 208 illustrated in FIG. 1. The recording unit 31 prints image data on recording paper using document data read by the scanner unit 11. Specifically, the paper transport unit 32 transports the recording paper to the image forming unit 33, the image forming unit 33 forms a toner image corresponding to the image data, the transfer unit 34 transfers the toner image onto the recording paper, and the fixing unit 35 fixes the toner image onto the recording paper to form thereby an image.

The network I/F unit 71 uses a network interface or the like to control exchange of various data with external devices, and provides also an internet connection, by way of Ethernet (TM) or the like via an LAN (Local Area Network). The HDD 74 stores image data read by the scanner unit 11, as well as output formats and the like that are set for the image data.

The operation unit 400 comprises the display unit 410 and the operation key unit 430 illustrated in FIG. 1. The display unit 410 comprises, for instance, a touch panel unit that combines a touch panel and an LCD. The display unit 410 displays various operation images and enables the user to input execution commands for various functions by touching the display surface (display operation keys). As described above, the operation key unit 430 comprises, for instance, a start key and a numerical keypad.

The control unit 50 comprises a control section 52 and a display image data storage unit 53.

The control section 52 comprises a main controller unit 521 and a display control unit 522. The main controller unit 521 governs the control of the operation of the multifunction machine 1. The display control unit 522 performs display control for displaying, on the display unit 410, for instance guidance information on the operation of the multifunction machine 1, as well as web pages or the like, directed at the user. The display image data storage unit 53 stores various image data to be displayed on the display unit 410. The various image data stored in the image data storage unit 53 comprise, for instance, images that display, to the user, respective operation guidance information on the multifunction machine 1.

Figure 3:
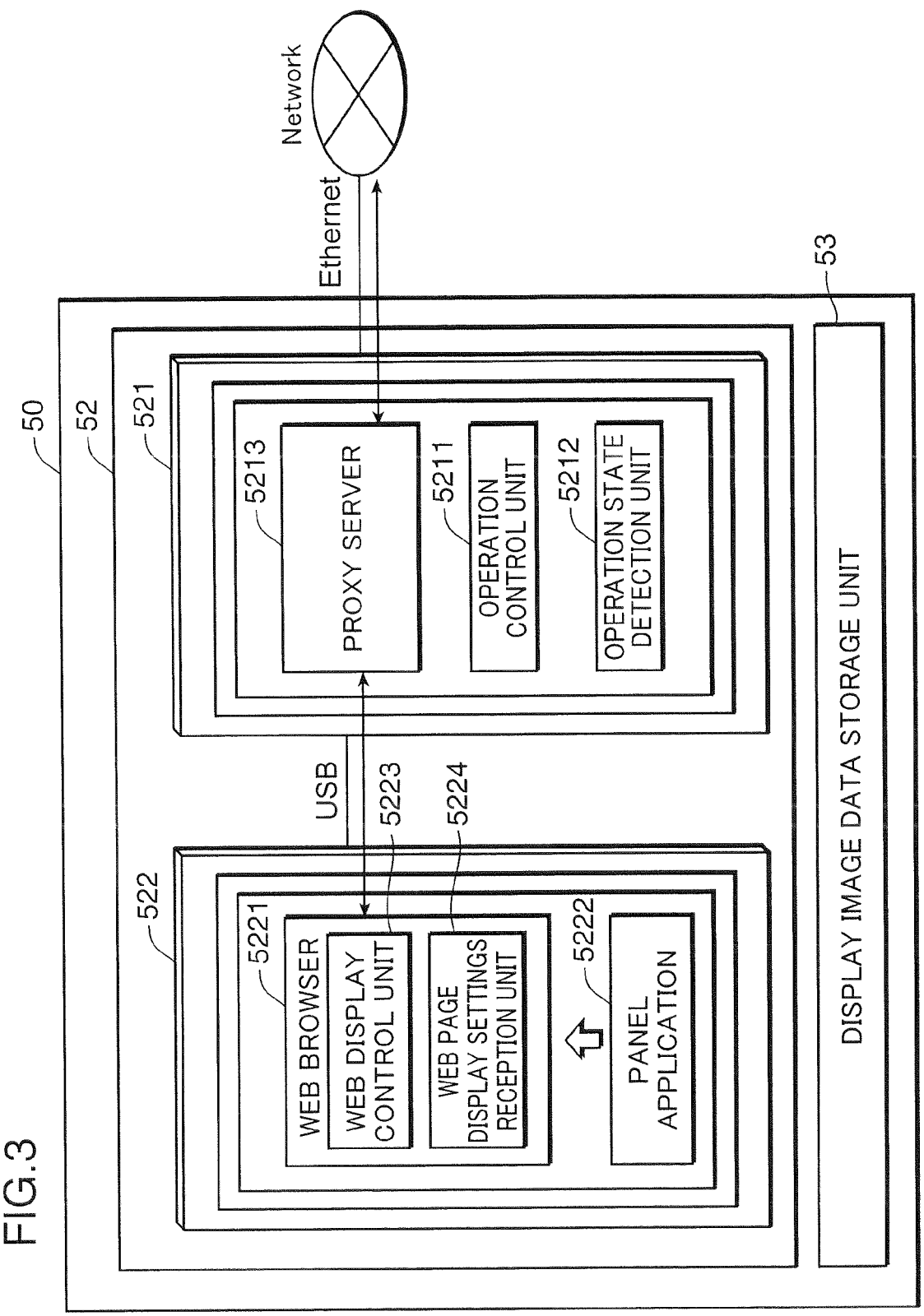
FIG. 3 is a diagram illustrating schematically the configuration of a control unit of the multifunction machine.

FIG. 3 is a diagram illustrating schematically the configuration of the control unit 50 of the multifunction machine 1. As described above, the control unit 50 comprises the main controller unit 521 and the display control unit 522. The main controller unit 521 comprises for instance a CPU. The display control unit 522 comprises for instance an ASIC (Application Specific Integrated Circuit). The boards that make up the foregoing are connected by way of, for instance, an USB (Universal Serial Bus).

The main controller unit 521 comprises an operation control unit 5211, an operation setting unit 5212 and a proxy server 5213.

The operation control unit 5211 governs the control of the operation of the various units of the multifunction machine 1 (scanner unit 11, image processing unit 21, recording unit 31 and so forth).

The operation setting unit 5212 receives and stores input from the user on operation settings relating to the operation of the various units of the multifunction machine 1, as well as web page display settings relating to web page display control by the web browser 5221 on the display unit 410. The web page display settings comprise, for instance, settings content relating to items such as port settings used for internet connection, font size settings or the like during web page display on the display unit 410, the first page (home page setting) that is displayed, as an initial screen, upon launching of the web browser 5221, proxy settings, cookie settings, display format settings, as well as, for instance, whether or not to use the web browser 5221 (system menu setting items).

Upon launching of the web browser 5221, the operation setting unit 5212 outputs the web page display settings to the web browser 5221. The web browser 5221 controls the display of the web page on the display unit 410 according to the web display settings.

The proxy server 5213 provides internet connection by being interposed between a web browser 5221 and an internet network. The proxy server 5213 is connected to internet by Ethernet™ or the like.

The display control unit 522 comprises the web browser 5221 and a panel application 5222.

The web browser (an example of web browser function units) 5221 executes the necessary processing or the like for displaying internet web pages on the display unit 410.

The web browser 5221 comprises a web display control unit 5223 and a webpage display setting reception unit 5224.

The web display control unit 5223 performs the required processing for displaying web pages on the display unit 410. Upon launching of the web browser 5221, as described above, the web display control unit 5223 acquires the web display settings information from the operation setting unit 5212, and displays a web page on the display unit 410 in accordance with the web page display settings.

The webpage display setting reception unit 5224 receives, and stores, the web page display settings input from the user. The web page display settings comprise, for instance, setting content relating to items such as display size (enlarge/reduce) setting, and character code setting. Upon receiving a web page display settings input from the user, the web page display setting reception unit 5224 displays input guidance images on the display unit 410, and receives inputs on various settings, through the touch panel function, based on the input guidance images that are pressed by the user. Upon receiving and storing the web page display settings input from the user, the webpage display setting reception unit 5224 validates the input only with the web browser function being displayed at that time, and invalidates the input when the web browser function displayed at that time is closed.

The panel application 5222 executes processing necessary for displaying, for instance, various operation guidance of the multifunction machine 1 on the display unit 410. The panel application 5222 reads, from the display image data storage unit 53, image data corresponding to the various operation guidance of the multifunction machine 1, and displays the image data on the display unit 410.

In the multifunction machine 1, in the case where the user inputs operation settings of the various units of the multifunction machine 1 and web page display settings into the operation setting unit 5212, the user presses the operation guidance images displayed on the display unit 410, whereby the operation setting unit 5212 receives inputs of the various settings by way of the touch panel function. The panel application 5222 displays the operation guidance images on the display unit 410 in order for the user to input operation settings and web page display settings via the operation setting unit 5212, as described above. The operation guidance images displayed on the display unit 410 in order for the user to input operation settings of the various units of the multifunction machine 1 will be referred to as operation guidance images for the image forming apparatus, while the operation guidance images displayed on the display unit 410 in order for the user to input web page display settings will be referred to as operation guidance images for the web browser.

In the example illustrated above, the control section 52 comprises the main controller unit 521, comprising a CPU, and the display control unit 522, comprising an ASIC. However, the present embodiment is not limited thereto. For instance, the operation control program according to an embodiment of the present invention may be stored in the HDD 74, such that the control section 52, comprising for instance a CPU, functions as the operation setting unit 5212 and as the web browser 5221, by operating in accordance with a display control program. In addition, the control section 52 may also function as the operation control unit 5211, the proxy server 5213 and the panel application 5222. The operation control program, which is provided to the user stored in a computer-readable medium, is storable in the HDD 74.

Figure 4:
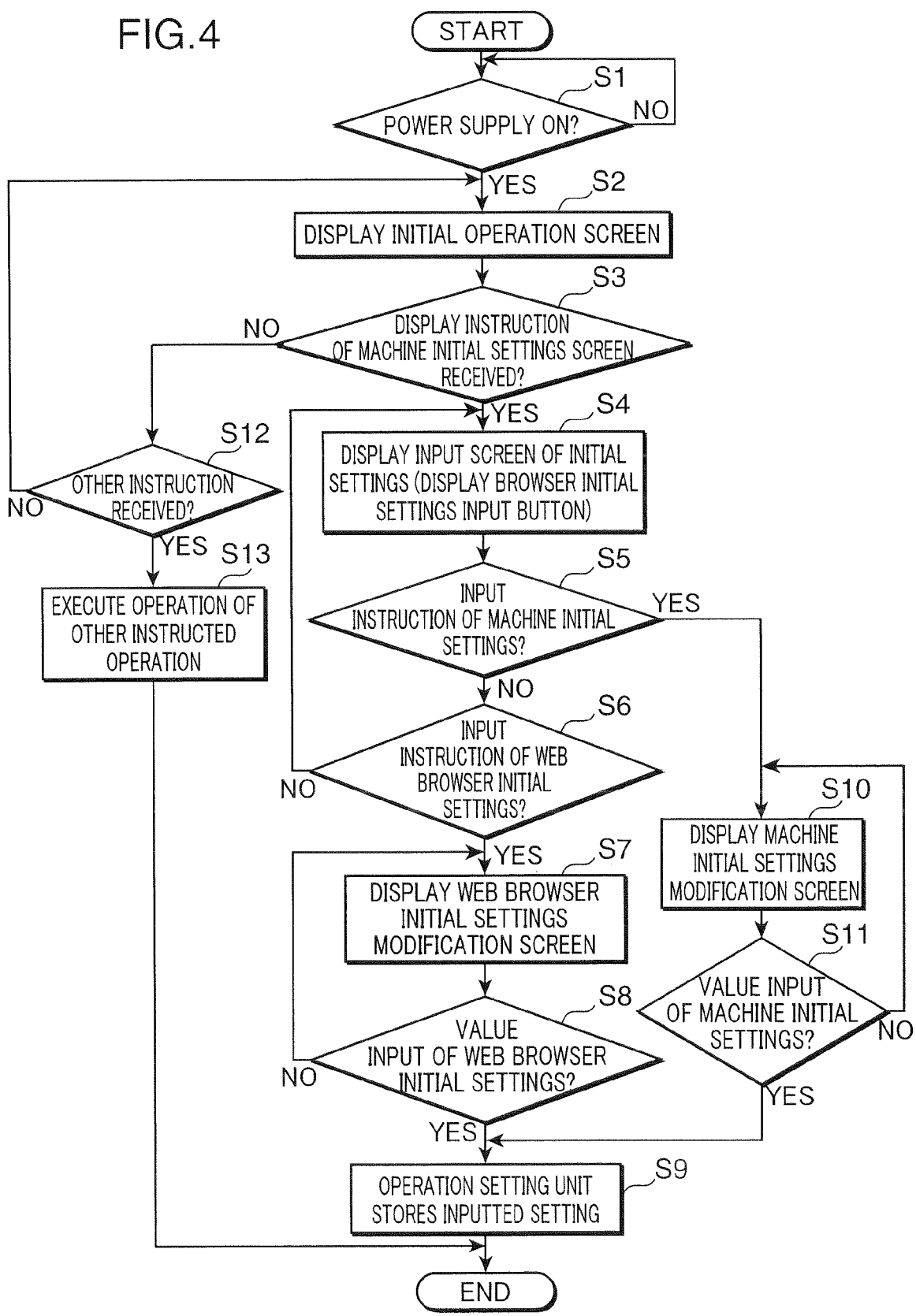
FIG. 4 is a flowchart illustrating a first embodiment of the process of receiving an input from the user on web page display settings and operation settings of the various units of the multifunction machine.
Figure 5:
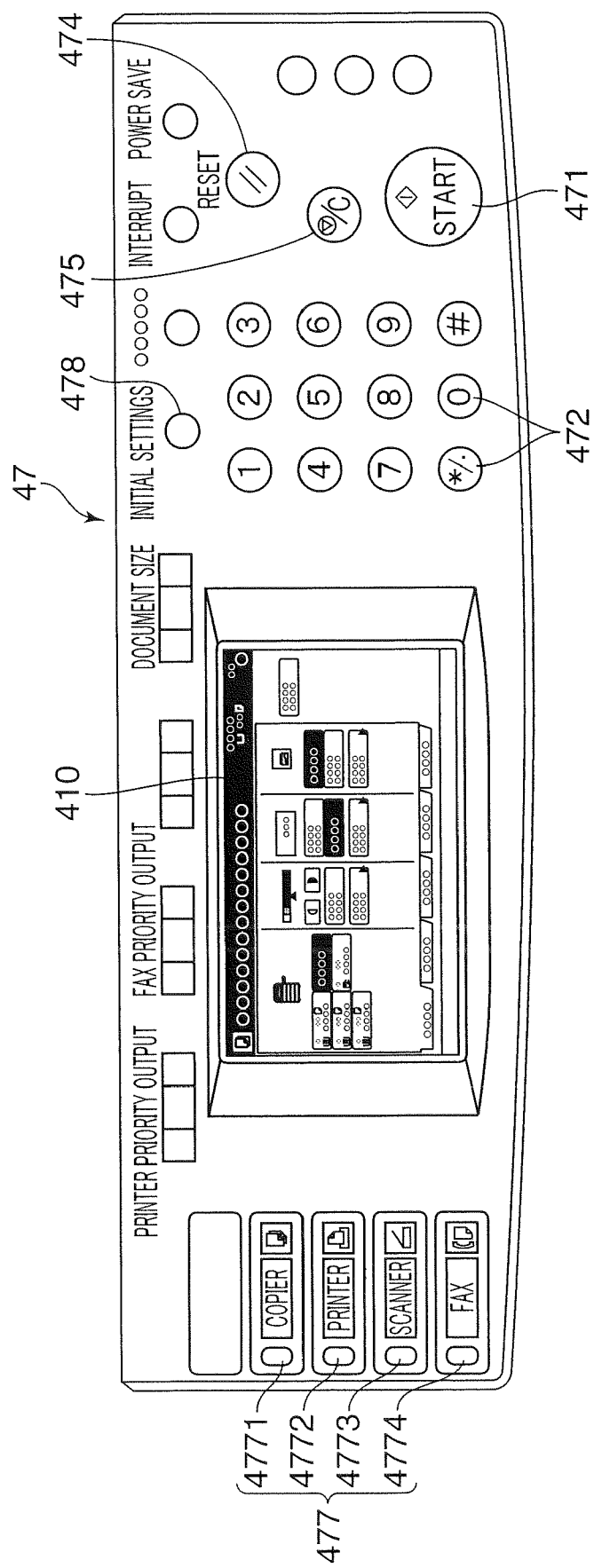
FIG. 5 is a diagram illustrating an operation panel section of an operation unit.
Figure 6:
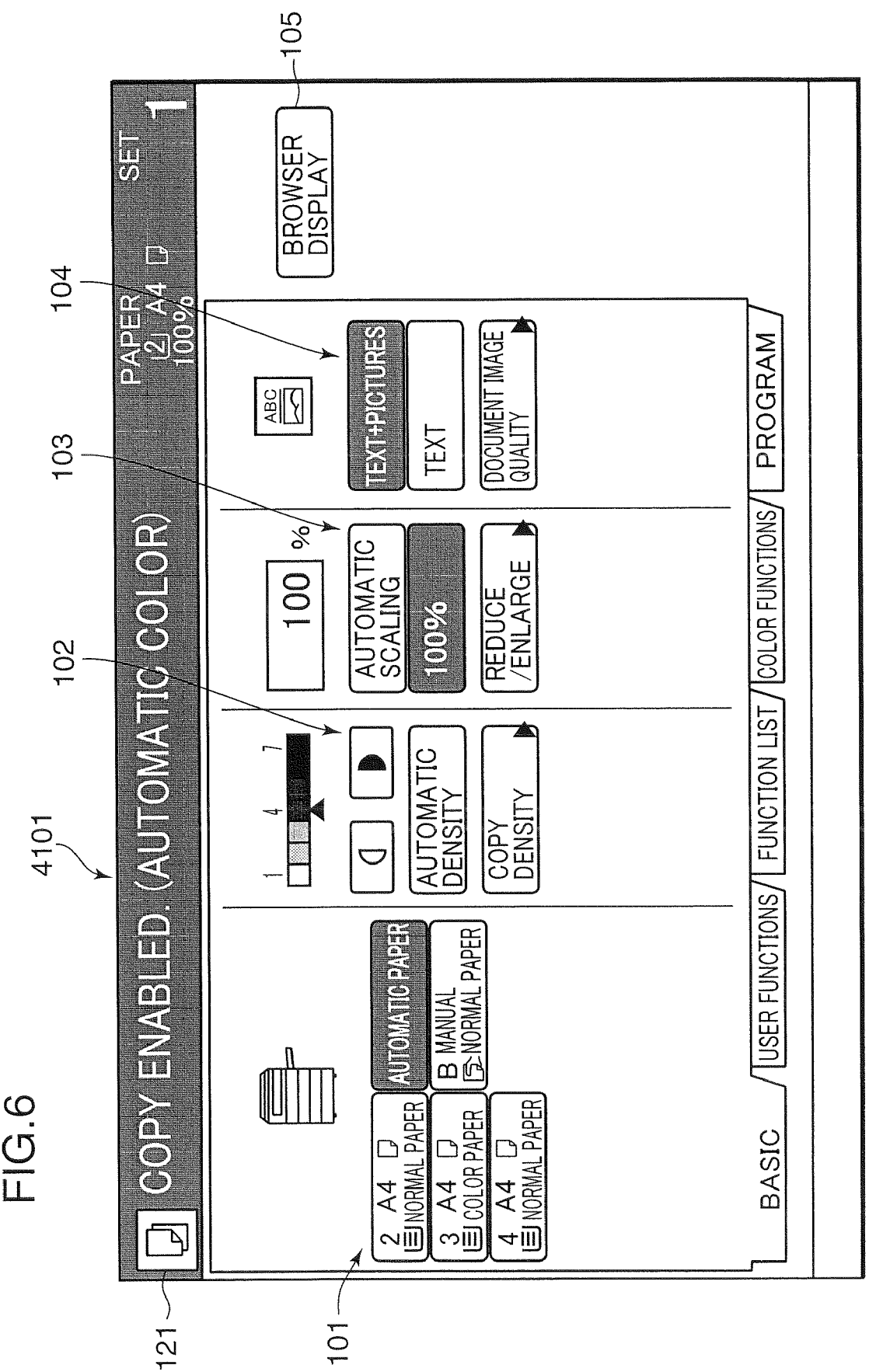
FIG. 6 is a diagram illustrating an example of an initial operation screen.
Figure 7:
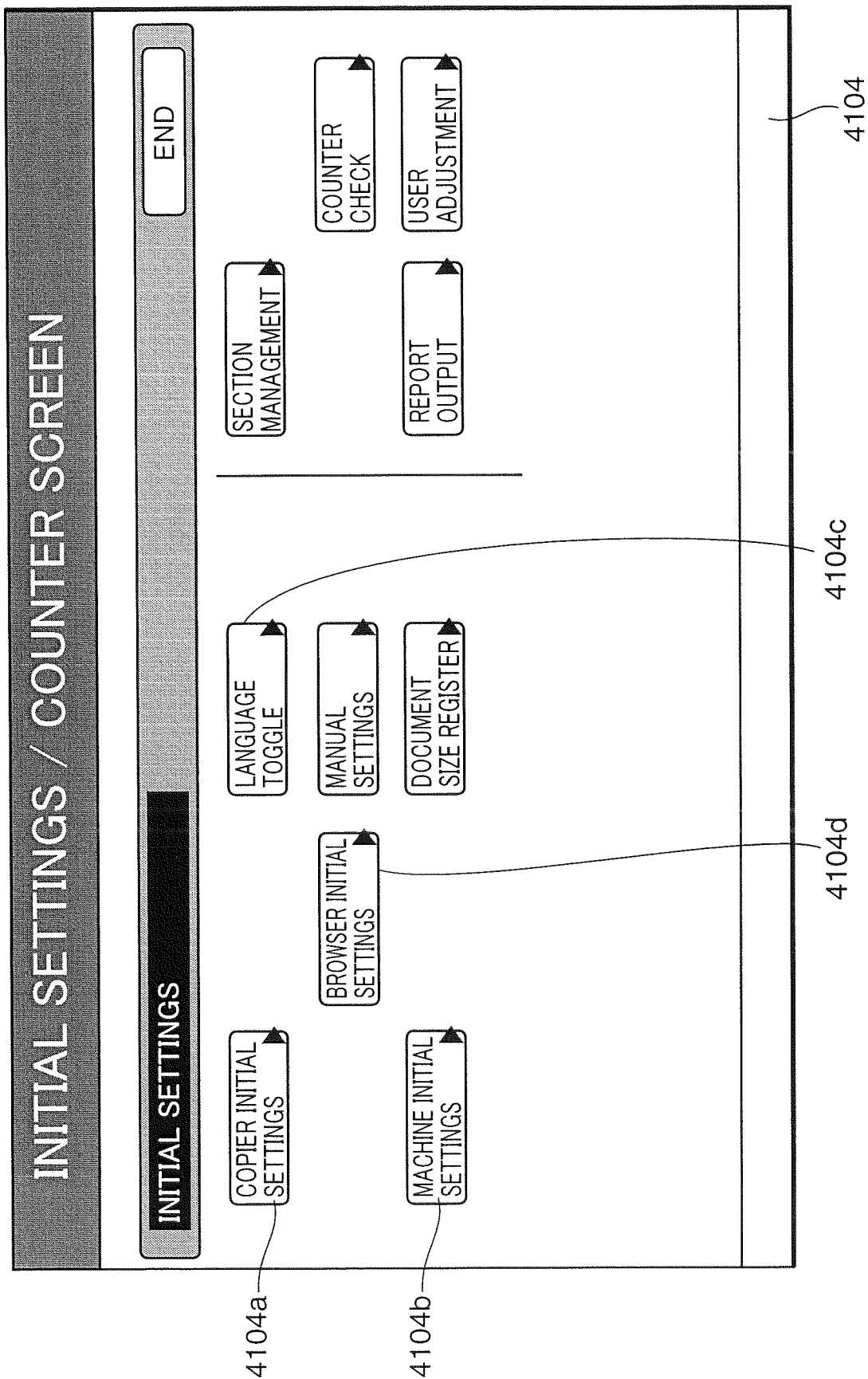
FIG. 7 is a diagram illustrating an example of a machine initial settings screen.
Figure 8:
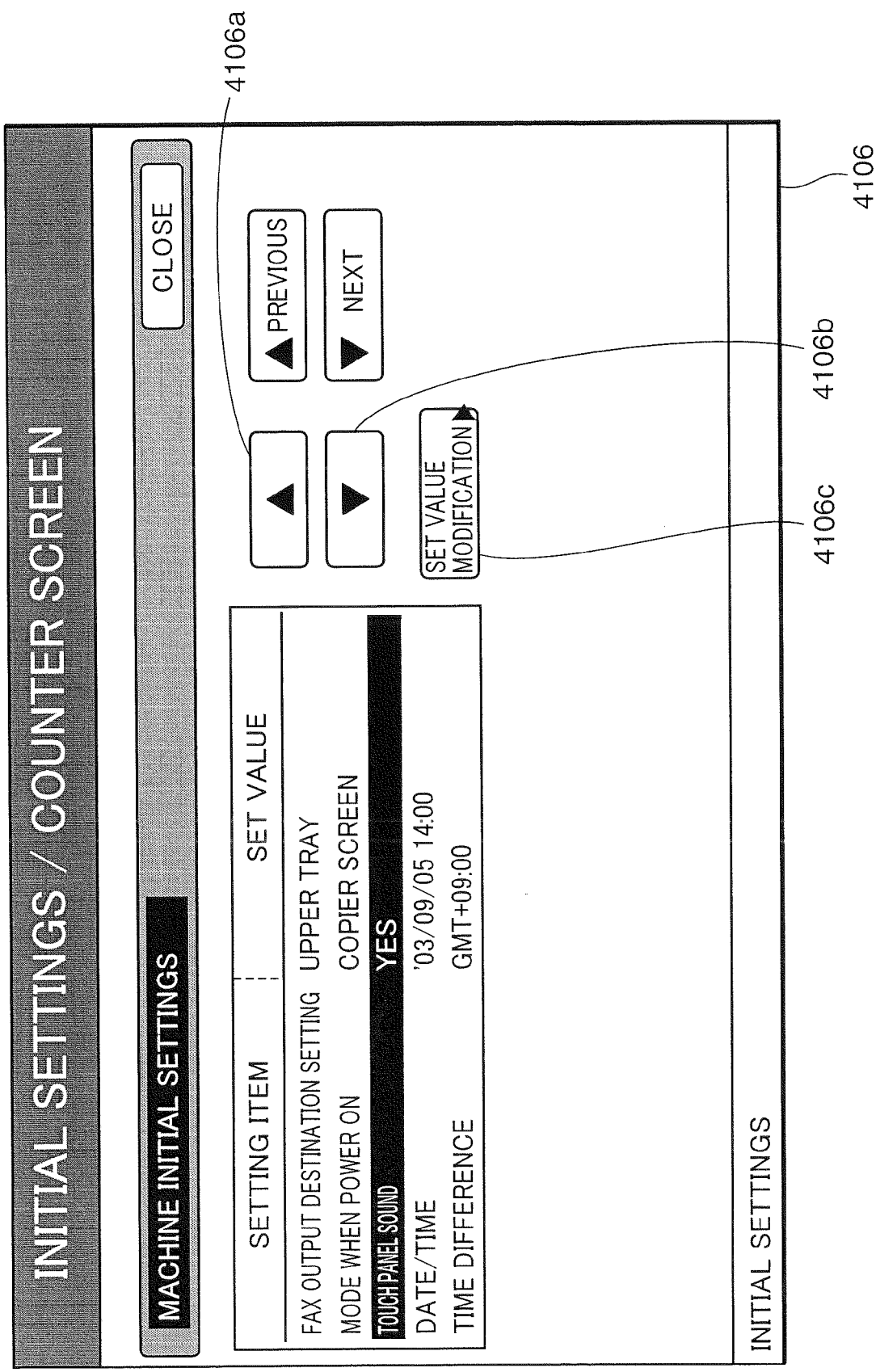
FIG. 8 is a diagram illustrating an example of a screen through which operation settings are inputted.
Figure 9:
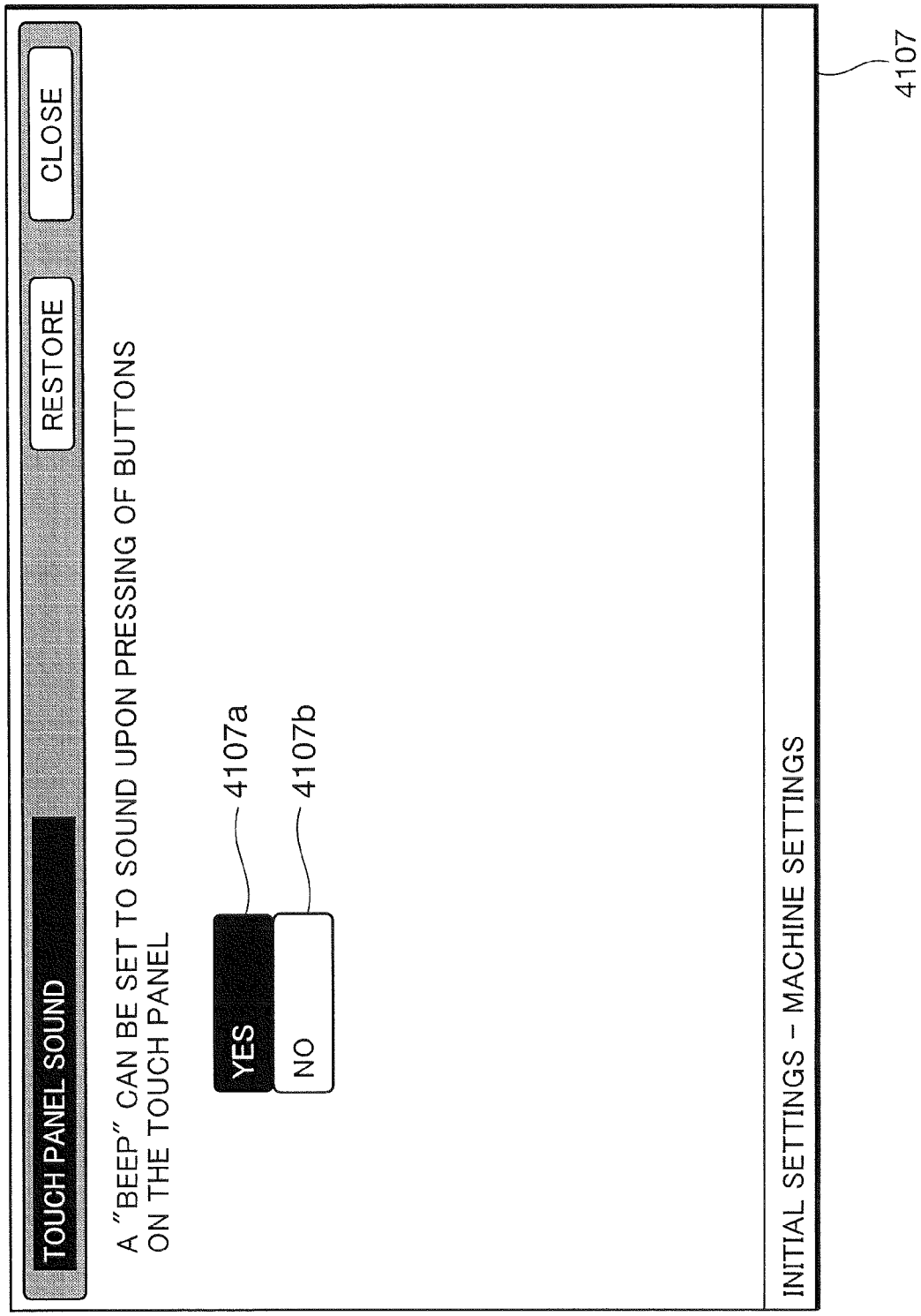
FIG. 9 is a diagram illustrating an example of a screen through which web page display settings are inputted.
Figure 10:
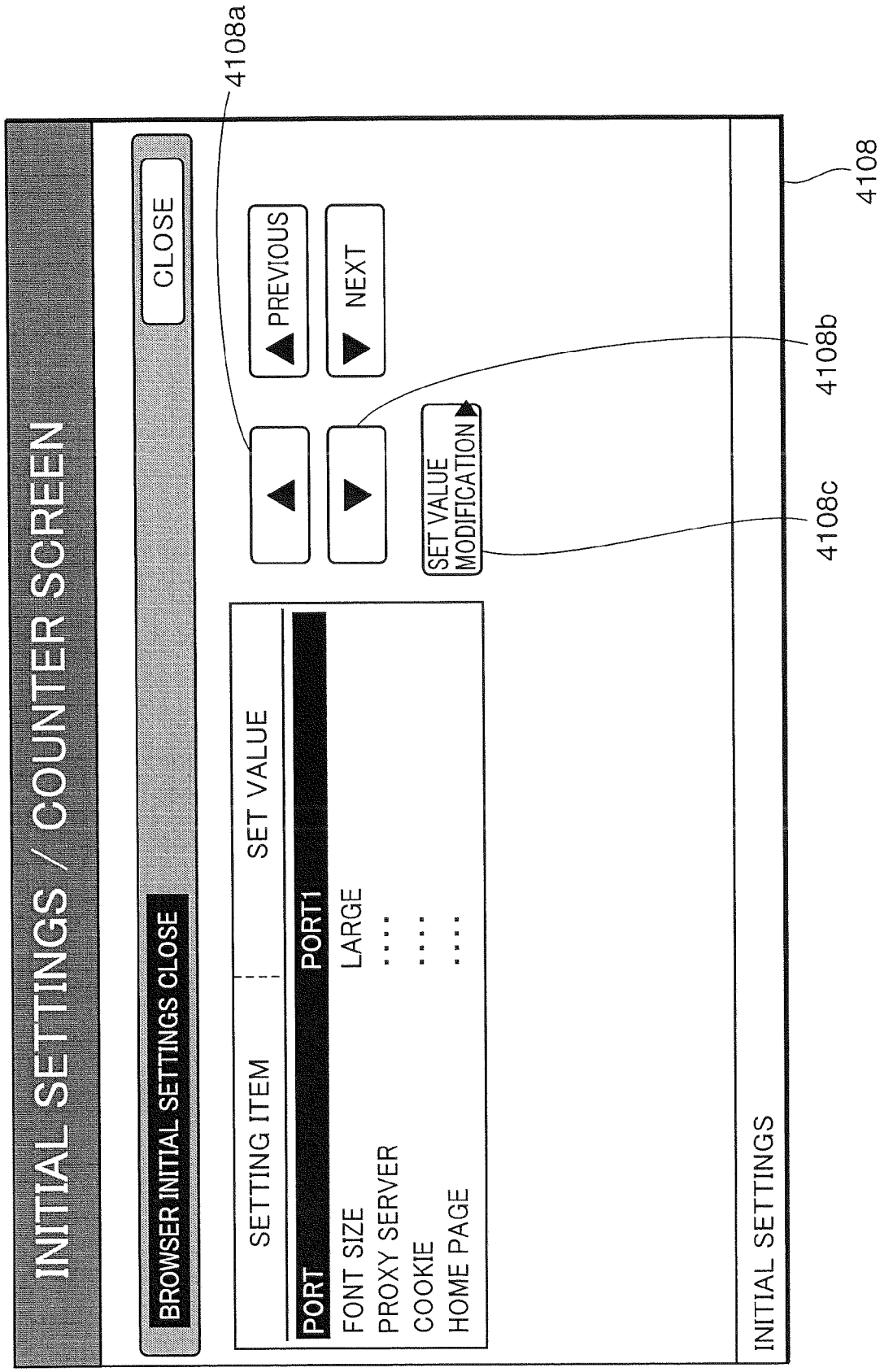
FIG. 10 is a diagram illustrating an example of a web browser setting item selection screen.
Figure 11:
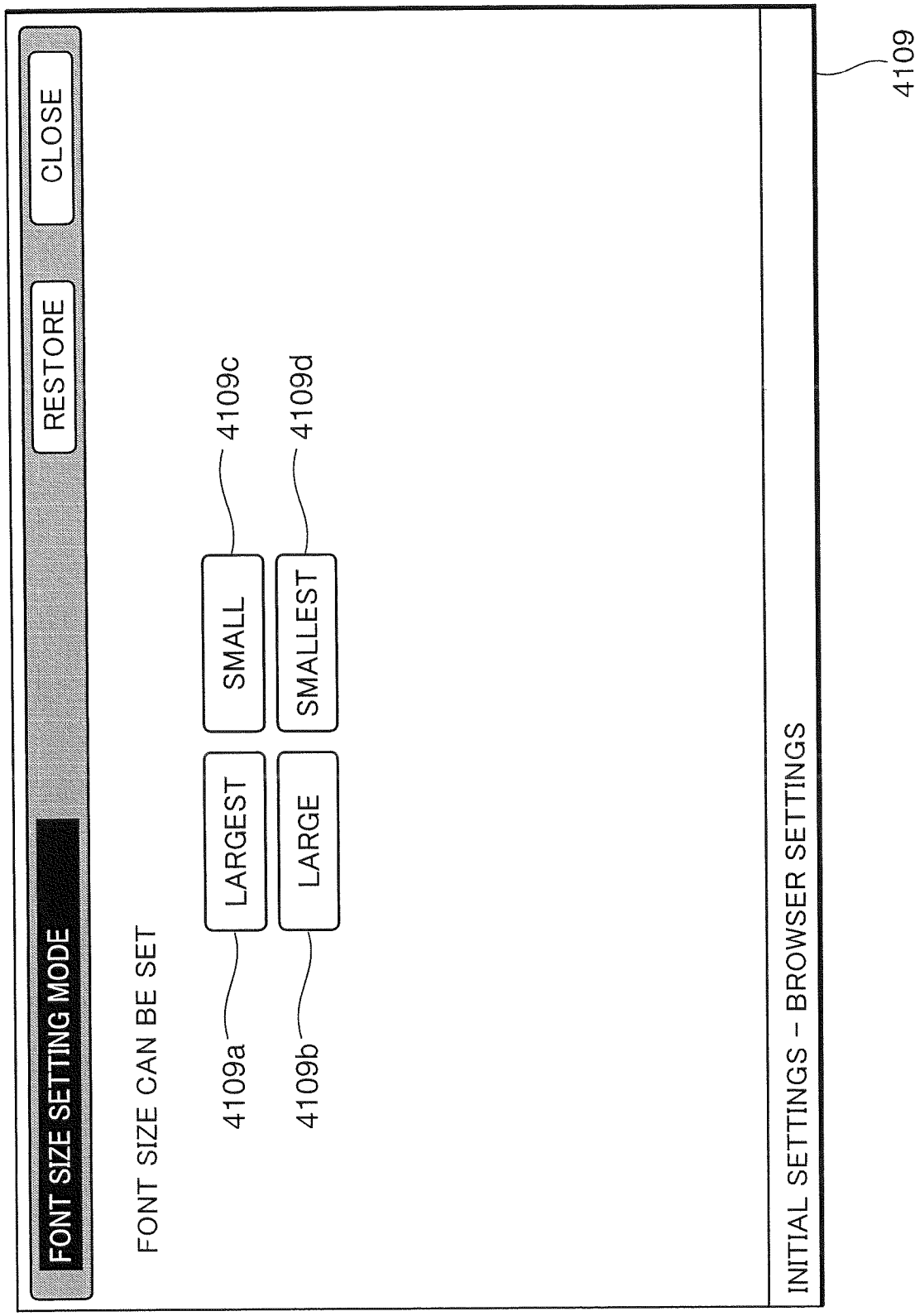
FIG. 11 is a diagram illustrating an example of a font size setting screen.

An explanation follows next on a first embodiment of the process of receiving an input from the user on web page display settings and operation settings of the various units of the multifunction machine 1. FIG. 4 is a flowchart illustrating a first embodiment of the process of receiving an input from the user on web page display settings and operation settings of the various units of the multifunction machine 1. FIG. 5 is a diagram illustrating an operation panel section of the operation unit 400. FIG. 6 is a diagram illustrating an example of an initial operation screen. FIG. 7 is a diagram illustrating an example of a machine initial settings screen. FIG. 8 is a diagram illustrating an example of a screen through which operation settings are inputted. FIG. 9 is a diagram illustrating an example of a screen through which web page display settings are inputted. FIG. 10 is a diagram illustrating an example of a web browser setting item selection screen. FIG. 11 is a diagram illustrating an example of a font size setting screen.

When the user turns on the main power source of the multifunction machine 1 to start using the multifunction machine 1 (YES in S1), the panel application 5222 reads image data corresponding to the initial operation screen from the display image data storage unit 53 and displays an initial screen 4101, such as the one illustrated in FIG. 6, on the display unit 410 (S2). The operation unit 400 is shaped so as to be capable of receiving, from the user, various operation execution instructions (for instance, copy operation execution instruction, display instruction of the machine initial settings screen relating to the operation of the multifunction machine 1) (S3, S12). The initial screen 4101 displays, for instance, keys 101 to 104, which receive various settings during, for instance, a copy operation, on the display unit 410 of an operation panel 47 illustrated in FIG. 5. The initial screen 4101 displays also a browser key 105 that receives, from the user, a web browser launch instruction for launching a web browser (instruction to the effect of displaying, on the display unit 410, a pre-set web page upon web browser launching). The web browser 5221, the operation control unit 5211 and the operation setting unit 5212 receive instructions inputted by the user through the touch panel function of the initial screen 4101 and the keys displayed on the various screens below.

The operation panel 47 is provided on the front of the multifunction machine 1. The operation panel 47 comprises a start key 471 for the user to input a printing execution instruction; a numerical keypad 472 for inputting, for instance, a number of print copies; and the display unit 410. The operation panel 47 comprises also a reset key 474 for resetting, for instance, the operation settings that are set on the display unit 410; a stop key 475 for stopping a printing (image forming) operation during execution; a function toggle key 477 for toggling between a copier function, a printer function, a scanner function and a fax function; and an initial settings button 478 that receives a display instruction input of the machine initial settings screen for receiving, from the user, an input of initial settings of the units of the multifunction machine 1.

When the user operates the operation unit 400 to input any operation execution instruction other than a web page display instruction, for instance a copy operation execution instruction, and the instruction is received by the operation unit 400 (NO in S3, YES in S12), the operation control unit 5211 executes the instructed operation, for instance a copy operation (S13). When the operation unit 400 receives no operation execution instruction from the user (NO in S12), the process returns to S2, the panel application 5222 displays the initial screen 4101 on the display unit 410, and the operation unit 400 remains in stand-by awaiting an operation execution instruction from the user.

When the user presses the initial settings button 478 of the operation panel 47 in the display of the initial screen 4101, and the panel application 5222 receives thereupon a display instruction input in the machine initial settings screen (YES in S3), the panel application 5222 displays, on the display unit 410, a machine initial settings screen 4104 (an example whereof is illustrated in FIG. 7) for inputting operation settings (initial settings) of the units of the multifunction machine 1 (S4). The panel application 5222 displays then, within the machine initial settings screen 4104, an array of buttons as the above-described operation guidance images for the image forming apparatus, including, for instance, a "copy initial settings" button 4104a, a "machine initial settings" button 4104b and a "language toggle" button 4104c, as well as a "browser initial settings" 4104d, as illustrated in FIG. 7.

When the user presses any of the operation guidance images for the image forming apparatus, for instance the "machine initial settings" button 4104b, and the panel application 5222 receives an instruction to the effect of inputting operation settings (initial settings) of the units of the multifunction machine 1 (YES in S5), the panel application 5222 display a setting item selection screen 4106, such as the one illustrated in FIG. 8, on the display unit 410 (S10).

Upon display of the setting item selection screen 4106, the user operates arrow keys 4106a, 4106b and a set value change button 4106c, whereupon for instance, the item "touch panel sound" is selected. Upon receiving this selection instruction, the panel application 5222 displays a touch panel sound settings screen 4107, such as the one illustrated in FIG. 9, on the display unit 410. When upon display of the touch panel sound settings screen 4107 the user operates the "yes" key 4107a or the "no" key 4107b to select whether the touch panel is to emit a sound or not, i.e. when a value of the operation guidance images of the units of the multifunction machine 1 is inputted (YES in S11), the operation setting unit 5212 receives the input of the value and stores the setting denoted by the inputted value (in this example, whether the touch panel emits sound or not) (S9).

On the other hand, when upon display of the machine initial setup screen 4104 the user presses the "browser initial settings" 4104d for the web browser, as an operation guidance image for the web browser, and the panel application 5222 receives an instruction to the effect of inputting the web page display settings (initial settings) into the web browser 5221 (NO in S5, YES in S6), the panel application 5222 displays a browser setting item selection screen 4108, such as the one illustrated in FIG. 10, on the display unit 410 (S7).

When upon display of the browser setting item selection screen 4108 the user operates arrow keys 4108a, 4108b and a set value change button 4108c, to select for instance the item "font size", and the panel application 5222 receives this selection instruction, a font size setting screen 4109 such as the one illustrated in FIG. 11 is displayed on the display unit 410. When upon display of the font size setting screen 4109 the user operates a "largest" key 4109a, a "large" key 4109b, a "small" key 4109c or a "smallest" key 4109d, by pressing for instance the "small" key 4109c to instruct thereby that the font size used upon display of the web page is to be a small size, i.e. when there is inputted a web page display settings value in the web browser 5221 (YES in S8), the operation setting unit 5212 receives input of the value and stores the setting denoted by the inputted value (in this example, setting the font size to small) (S9).

In the present embodiment, the operation setting unit 5212 stores and manages both the operation settings of the units of the multifunction machine 1 and the web page display settings for the web browser 5221.

Figure 12:
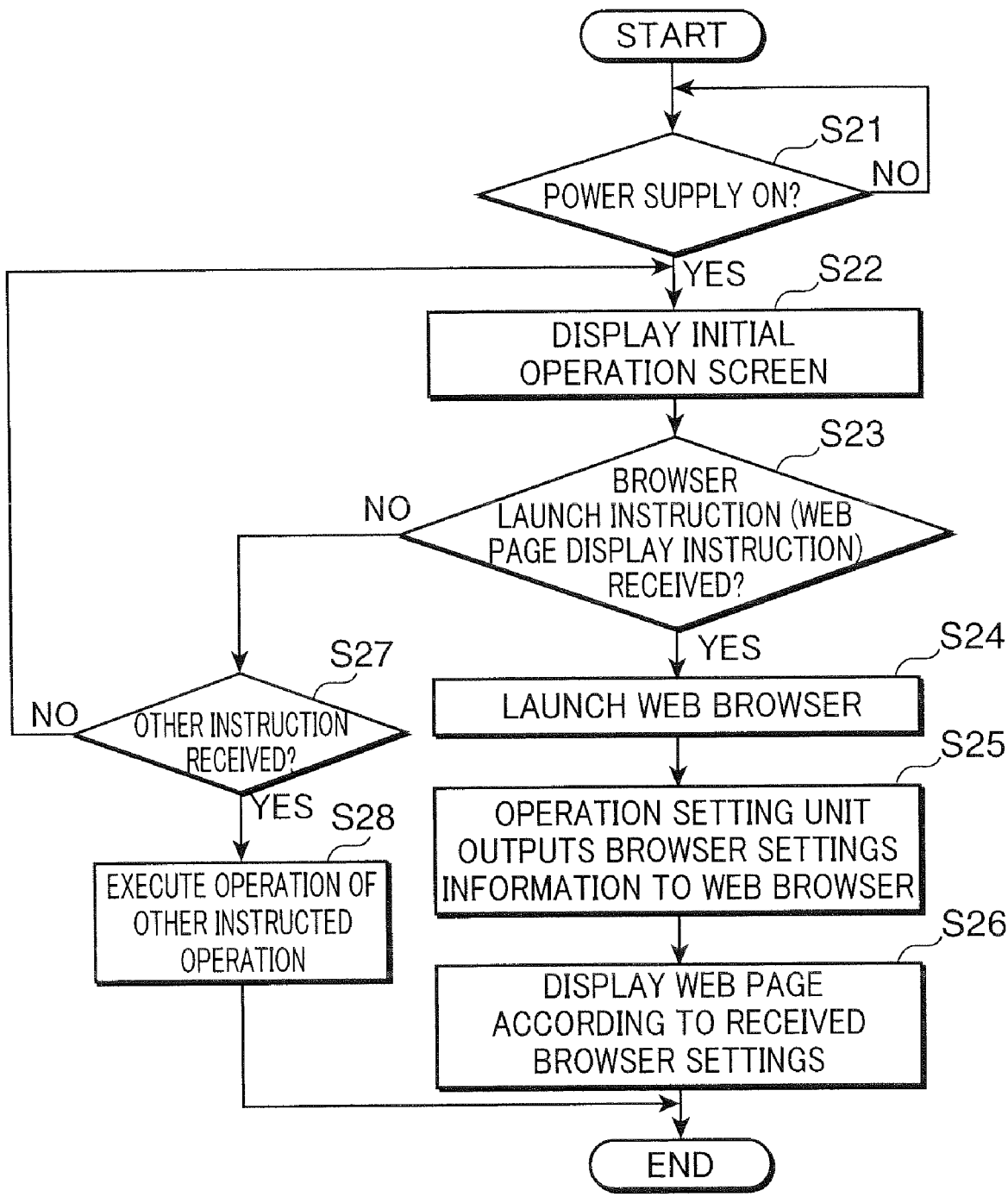
FIG. 12 is a flowchart illustrating display control of a display unit in the multifunction machine.
Figure 13:
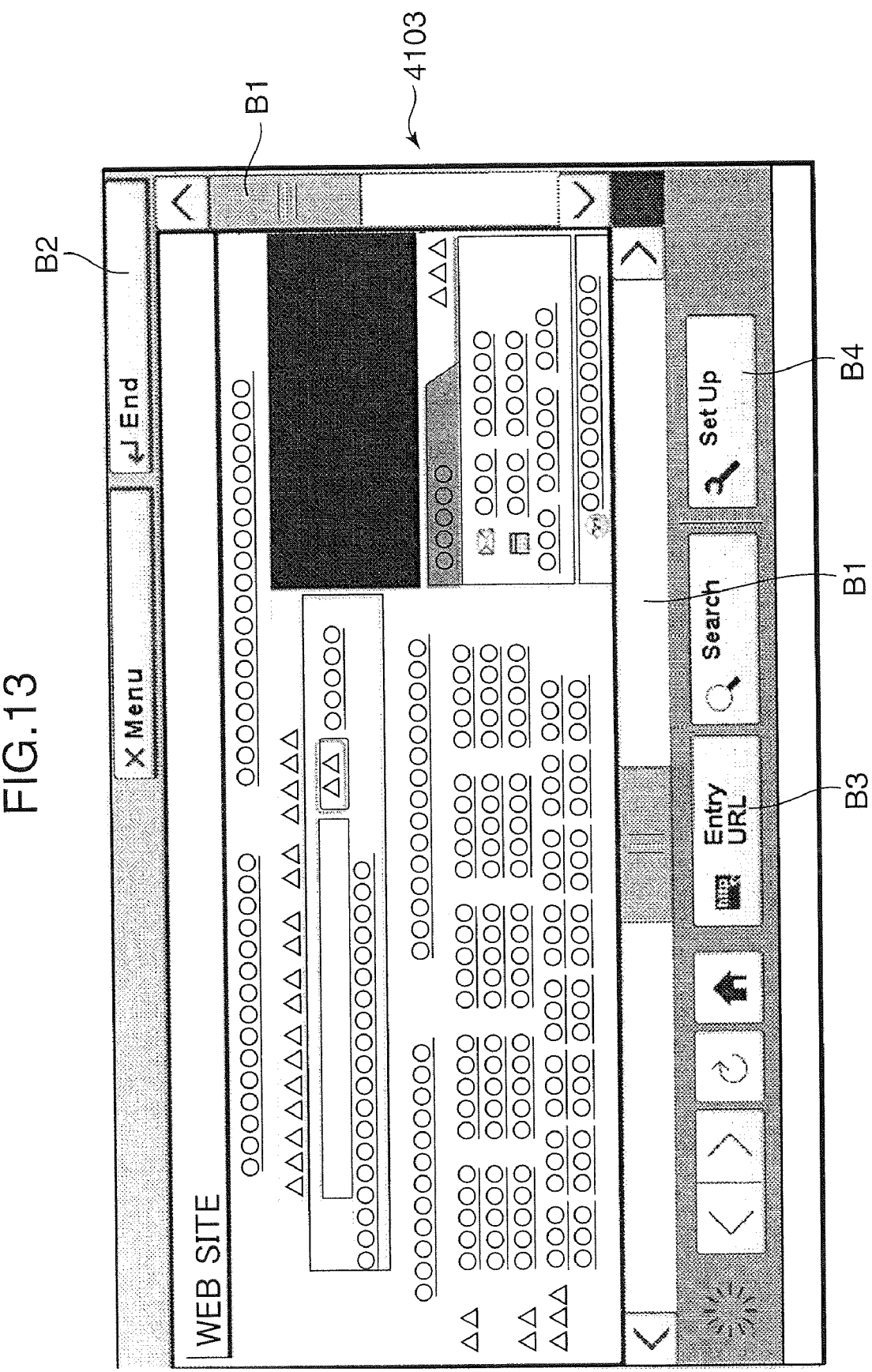
FIG. 13 is a diagram illustrating an example of a web page display screen.

An explanation follows next on display control of the display unit 410 in the multifunction machine 1. FIG. 12 is a flowchart illustrating display control of the display unit 410 in the multifunction machine 1. FIG. 13 is a diagram illustrating an example of a web page display screen.

When the user turns on the main power source of the multifunction machine 1 to start using the multifunction machine 1 (YES in S21), the panel application 5222 reads image data corresponding to the initial operation screen, from the display image data storage unit 53, and displays an initial screen 4101 (FIG. 6) on the display unit 410 (S22). The operation unit 400 is shaped so as to be capable of receiving, from the user, various operation execution instructions (for instance, a copy operation execution instruction or a web page display instruction) (S23, S27).

When the user operates the operation unit 400 to input an operation execution instruction other than a web page display instruction, for instance a copy operation execution instruction, and the instruction is received by the operation unit 400 (NO in S23, YES in S27), the operation control unit 5211 executes the instructed operation, for instance a copy operation (S28). When the operation unit 400 receives no operation execution instruction from the user (NO in S27), the process returns to S22.

On the other hand, when the user presses the browser key 105 on the initial screen 4101 and there is received, through the touch panel function, a launch instruction of the web browser 5221 (web page display instruction) (YES in S23), the web browser 5221 starts running on the basis of, for instance, this web page display instruction (S24). The operation setting unit 5212 outputs then the stored web page display settings information to the web browser 5221 (S25).

When the web display control unit 5223 of the web browser 5221 acquires the above-mentioned web page display settings information from the operation setting unit 5212, the web display control unit 5223 accesses, via the proxy server 5213, the web site of the web page that is set as the first page upon web browser display, in accordance with the web page display settings (i.e. various items required for web page display, for instance the items denoted by the above web page display settings, such as port settings, font size, first page as the initial screen, proxy settings and so forth). The web display control unit 5223 acquires, from the web site, image data of the web page that constitutes the first page, and displays a webpage display screen 4103, for instance such as the one illustrated in FIG. 13, on the display unit 410 (S26).

The web display control unit 5223 displays, for instance, a scroll bar B1 and a screen close button B2 on the webpage display screen 4103. The scroll bar B1, the screen close button B2 and the like make it easier for the user to input a web page scroll instruction, a close web page instruction and the like by way of the touch panel function. The sizes of the scroll bar B1, the screen close button B2 and the like are set therefore so as to be easily touchable by the user's fingers.

Herein, the web browser 5221 may be configured so as to be interchangeable with a different web browser in the multifunction machine 1. Upon launching of the web browser 5221, the operation setting unit 5212 outputs the web page display settings that are stored at that moment to the web browser 5221, as described above. Therefore, when the web browser 5221 is replaced by a different web browser, the operation setting unit 5212 outputs the stored web page display settings to the web browser function unit after replacement, upon launching of the web browser after replacement. The web browser after replacement controls the display of web pages on the display unit 410 using web page display settings received from the operation setting unit 5212.

Figure 14:
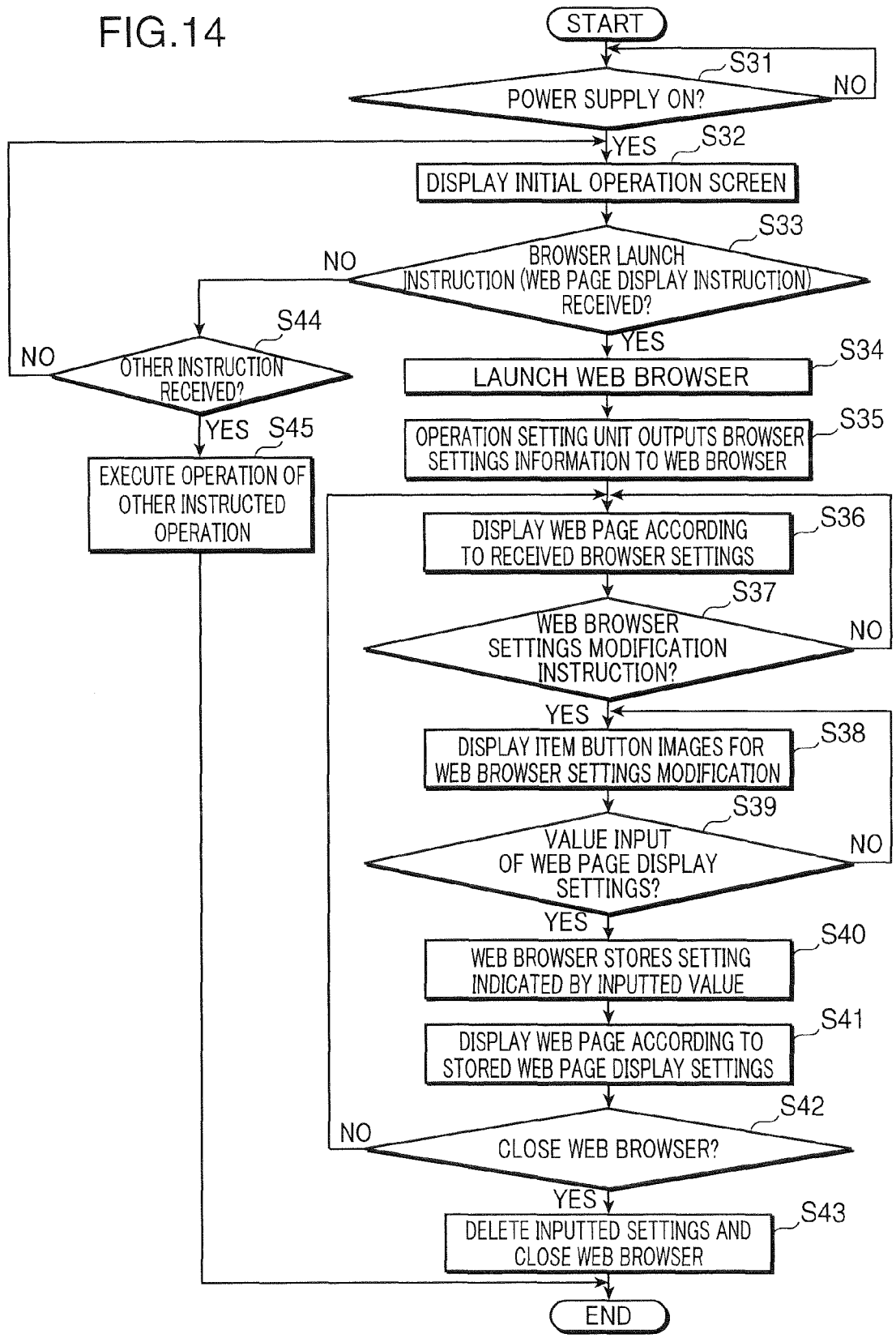
FIG. 14 is a flowchart illustrating processing in an instance where web page display settings are received by a web browser.
Figure 15:
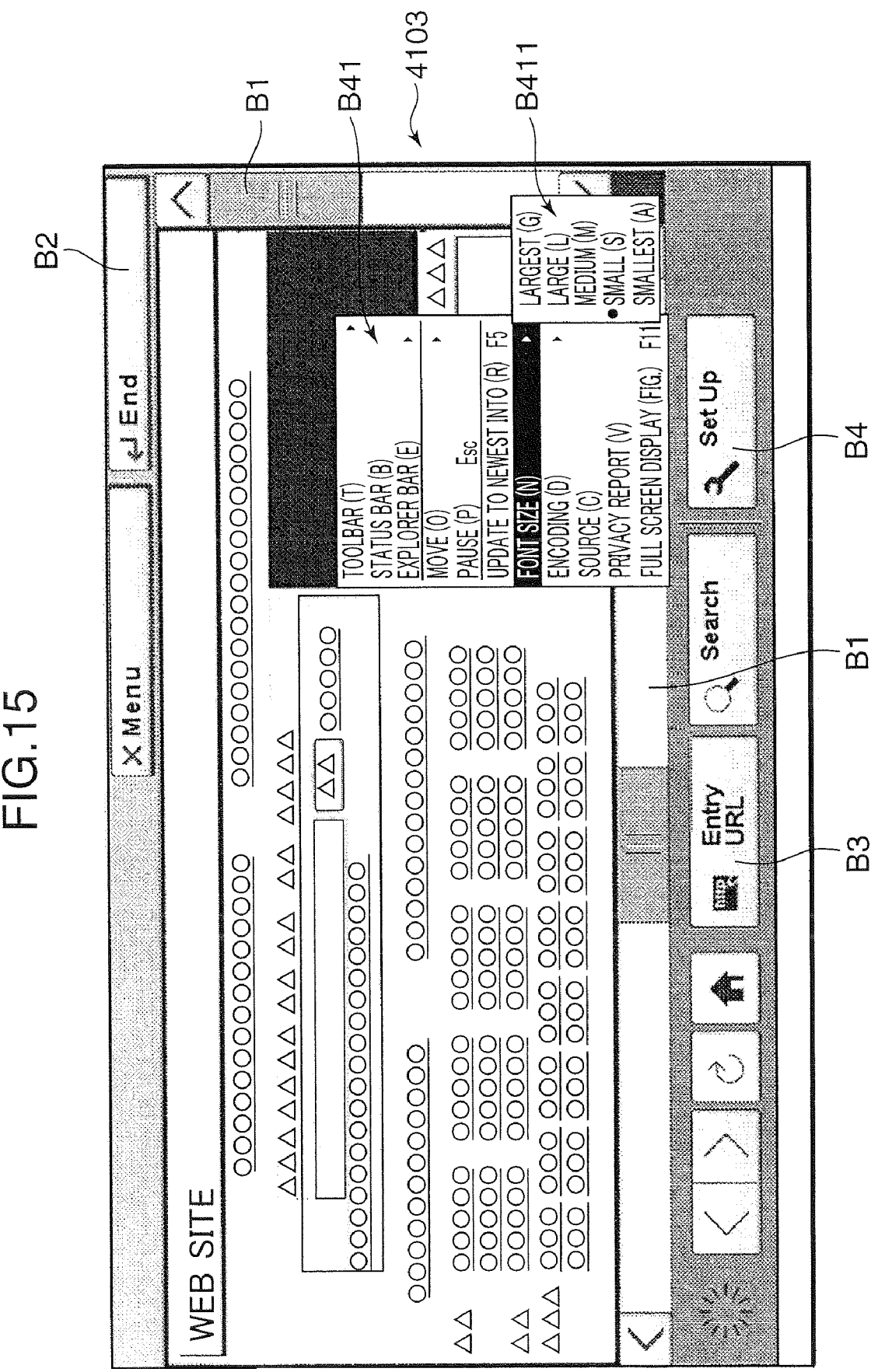
FIG. 15 is a flowchart illustrating an example of a display screen in an instance where web page display settings are inputted through the web browser.

An instance of processing in which web page display settings are received by the web browser 5221 is explained next. FIG. 14 is a flowchart illustrating processing in an instance where web page display settings are received by the web browser 5221. FIG. 15 is a flowchart illustrating an example of a display screen in an instance where web page display settings are inputted through the web browser 5221. Processing identical to that illustrated in FIG. 12 will not be explained again.

When the web display control unit 5223 displays the webpage display screen 4103 on the display unit 410 in accordance with the port settings, font size settings font size settings and the like acquired from the operation setting unit 5212 (S36), the image of a driver button B4, for receiving inputs from the user for modifying the web page display settings, is displayed within the webpage display screen 4103.

When the web display control unit 5223 receives, by way of the touch panel function, a web page display settings modification instruction upon pressing of the driver button B4 by the user (YES in S37), the web display control unit 5223 displays, within the webpage display screen 4103, images of item buttons for receiving modification instructions on web page display settings (S38). For instance, the web display control unit 5223 pulls up an item button B41, for receiving modification instructions on web page display settings, at a position above the display position of the driver button B4 of the webpage display screen 4103, as illustrated in FIG. 15. When the user presses then, for instance, the "font size" field of the item button B41 and the web display control unit 5223 receives, by way of the touch panel function, an instruction corresponding to this pressing, the web display control unit 5223 displays a font size selection button B411 at a position adjacent to the item button B41, as illustrated in FIG. 15. When the user presses then, for instance, the field "small", whereby the web page display setting reception unit 5224 receives, by way of the touch panel function, an input of a value of web page display settings for modifying the font size to a small font size (YES in S39), the web page display setting reception unit 5224 stores the web page display settings (in this case, changing the font size to small) indicated by the inputted value (S40).

When the web page display setting reception unit 5224 stores thus the web page settings, the web display control unit 5223 re-displays the web page being displayed, on the basis of these stored web page display settings (S41). The displayed web page is displayed again with the font size changed to a small size.

Thereafter, when the web browser 5221 receives an instruction to the effect of closing the web browser function running at that moment, following an operation of the screen close button B2 by the user (YES in S42), the web browser 5221 deletes the above-described web page settings, whose input was received by the web page display setting reception unit 5224, and closes the web browser function running at that time (S43). That is, when the web page display setting reception unit 5224 receives an input from the user for modifying the web page display settings, the web page display setting reception unit 5224 stores the modified web page display settings, and the web page display settings for which input is received are validated only for the web browser running at the time that the input is received. When the web browser running at that time is closed, the web browser 5221 deletes the web page display settings stored by the web page display setting reception unit 5224.

As a result, a state, in which only web page display settings for which an input is received from the user by the operation setting unit 5212 of the main controller unit 521 are stored, is maintained in the operation setting unit 5212. When the web browser 5221 launches again the web browser function, or when a different web browser, after browser changeover, launches a web browser function, the web page display settings stored in the operation setting unit 5212 are reflected on the web page display control by the newly launched web browser function. The web page display settings stored in the web page display setting reception unit 5224 are deleted as described above, and hence are not reflected in web page display control by the newly launched web browser function.

The present invention is not limited to the above embodiments and may accommodate various modifications. In the explanation of first or second embodiment, for instance, the web browser 5221 performs processing of web page display on the display unit 410. However, the agent of such processing is not limited to a so-called web browser application, and may be any application or circuit capable of executing the above-described processes. That is, the web browser 5221 in the embodiments includes conceptually any application or circuit capable of executing the above processes.

In the above embodiments, FIGS. 1 through 15 illustrate embodiments of the display control device, image forming apparatus and display control program according to the present invention. These are however merely illustrative of examples of the present invention, and are not meant in any way to limit the configurations, processes and so forth of the present invention.

Essentially, the present invention is an image forming apparatus comprising a display unit that displays an image; a web browser function unit that causes the display unit to display a web page; and an operation setting unit that receives from a user and stores an input of operation settings relating to the operation of the image forming apparatus, and of web page display settings relating to web page display control on the display unit by the web browser function unit; wherein upon start-up of the web browser function unit, the operation setting unit outputs the web page display settings to the web browser function unit, and the web browser function unit controls the display of the web page on the display unit according to the web page display settings.

Also, the present invention is a computer-readable medium which stores an operation control program for causing a computer, built into an image forming apparatus, to function as: a web browser function unit that causes a display unit of the image forming apparatus to display a web page; an operation setting unit that receives from a user and stores an input of operation settings relating to the operation of the image forming apparatus, and of web page display settings relating to web page display control on the display unit by the web browser function unit; and to function in such a manner that, upon start-up of the web browser function unit, the operation setting unit outputs the web page display settings to the web browser function unit, and the web browser function unit controls the display of the web page on the display unit according to the received web page display settings.

In these inventions, the operation setting unit receives from the user, and stores, an input of operation settings relating to the operation of the image forming apparatus, and of web page display settings by the web browser function unit, such that upon start-up of the web browser function unit, the operation setting unit outputs the web page display settings to the web browser function unit, and the web browser function unit performs web page display control according to the web page display settings. Therefore, both setting informations are collectively managed by the operation setting unit. This makes it easier to manage the various setting information by the operating system of the image forming apparatus, and simplifies the operations that the user has to perform to input the various settings.

Also, the present invention is an image forming apparatus further comprising a display control unit that displays, on the display unit, an operation guidance image for an image forming apparatus in order for the user to input the operation settings, wherein the display control unit displays, on the display unit, an operation guidance image for a web browser, for inputting the web page display settings, alongside the operation guidance image for an image forming apparatus, and the operation setting unit receives from the user, by way of a touch panel function, an input of the operation settings in response to a user operation based on the operation guidance image for an image forming apparatus, and receives from the user, by way of the touch panel function, an input of the web page display settings in response to a user operation based on the operation guidance image for a web browser.

In this invention, the display control unit displays, on the display unit, the operation guidance image for a web browser, for inputting the web page display settings, alongside the operation guidance image for an image forming apparatus, and the operation setting unit receives from the user, by way of a touch panel function, an input of the operation settings relating to the operation of the image forming apparatus, in response to a user operation based on the operation guidance image for an image forming apparatus, and receives from the user an input of the web page display settings in response to a user operation based on the operation guidance image for a web browser. Therefore, the user can input operation settings relating to the operation of the image forming apparatus, as well as web page display settings used in the web browser function unit, by way of an identical operation, which further simplifies the operations that the user has to perform to input the various settings.

The present invention is also an image forming apparatus wherein the web browser function unit is configured to be replaceable in the image forming apparatus, and upon start-up of the web browser function unit after replacement, the operation setting unit outputs the stored web page display settings to a web browser function unit after replacement, and the web browser function unit controls the display of the web page on the display unit according to the received web page display settings.

In this invention, the operation setting unit outputs the web page display settings also to the web browser function unit after replacement, upon start-up thereof, and the web browser function unit performs web page display control according to the web page display settings. When the web browser function unit is replaced by a new web browser function unit, therefore, the web page display settings stored until then in the operation setting unit can be used effectively also in the new web browser function unit. As a result, the user need not carry out an operation of inputting the web page display settings for the new web browser function unit that replaces a former web browser function unit. This allows simplifying the operations that the user has to carry out when replacing the web browser function unit.

The present invention is also an image forming apparatus wherein the web browser function unit comprises a web page display setting reception unit that receives an input of the web page display settings from the user, and when the web page display setting reception unit receives and stores an input for modifying the web page display settings from the user, the input is validated only for the web browser function unit running at that time, and the input is invalidated when the web browser function unit running at that time is closed.

In this invention, when the user modifies, through input, the web page display settings in the web browser function unit, the web browser function unit validates the input only for the web browser function running at that time, and invalidates the input when the web browser function is closed. Therefore, only web page display settings for which an input is received by the operation setting unit are stored in the operation setting unit, so that when the web browser function unit is started up again, the web page display settings stored in the operation setting unit are reflected on the web page display control by the web browser function unit. Management of the various setting informations in the operation control system of the image forming apparatus is kept easy as a result.

The present invention is also an image forming apparatus wherein the web browser function unit comprises a web page display setting reception unit that receives an input of the web page display settings from the user, and when the web page display setting reception unit receives an input for modifying the web page display settings from the user, the web page display setting reception unit stores the modified web page display settings such that the web page display settings, for which the input is received, are validated only for the web browser function unit running at the time that the input is received, and when the web browser function unit running at that time is closed, the web page display settings stored in the web page display setting reception unit are deleted, a state, in which only web page display settings for which an input is received from the user by the operation setting unit are stored, is maintained in the operation setting unit, and upon new start-up of the web browser function unit, the operation setting unit outputs the web page display settings, received from the user and stored, to the newly started-up web browser function unit, and the web browser function unit controls the display of the web page on the display unit according to the received web page display settings.

In this invention, if the user inputs web page display settings to the operation setting unit, a state, in which only the web page display settings inputted by the user are stored in the operation setting unit, is maintained. This allows using the web page display settings stored in the operation setting unit for both the web browser function unit running at that time as well as for the web browser function unit newly started up. On the other hand, if the user inputs web page display settings to the web browser setting reception unit of the web browser function unit, the input is validated only for the web browser function running at that time, and the input is invalidated when the browser function is closed. Depending on whether the user inputs web page display settings to the operation setting unit or to the web page display setting reception unit, therefore, the user can selectively validate inputted web page display settings only for a web browser function unit already running, or to validate inputted web page display settings also for a newly started-up web browser function unit.

This application is based on Japanese Patent application serial No. 2008-235430 filed in Japan Patent Office on Sep. 12, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus, comprising:
a display unit that displays an image;
a web browser function unit that causes the display unit to display a web page;
an operation setting unit that receives from a user and stores an input of operation settings relating to the operation of the image forming apparatus, and of web page display settings relating to web page display control on the display unit by the web browser function unit; and
a display control unit;
wherein upon start-up of the web browser function unit, the operation setting unit outputs the web page display settings to the web browser function unit, and the web browser function unit controls the display of the web page on the display unit according to the web page display settings,
the display control unit causes the display unit to display an initial settings screen including a first additional settings button and a second initial settings button when receiving a display instruction input of the initial settings screen from the user in the display of an initial screen on the display unit, causes the display unit to display a screen for inputting initial settings of the operation settings when the first initial settings button is pressed and causes the display unit to display a screen for inputting initial settings of the web page display settings when the second initial settings button is pressed.

2. The image forming apparatus according to claim 1, further comprising:
wherein the display control unit displays, on the display unit, an operation guidance image for a web browser, for inputting the web page display settings, as the second initial settings button alongside an operation guidance image for an image forming apparatus in order for the user to input the operation settings, as the first initial settings button, and
the operation setting unit receives from the user, by way of a touch panel function, an input of the operation settings in response to a user operation based on the operation guidance image for an image forming apparatus, and receives from the user, by way of the touch panel function, an input of the web page display settings in response to a user operation based on the operation guidance image for a web browser.

3. An image forming apparatus, comprising:
a display unit that displays an image;
a web browser function unit that causes the display unit to display a web page; and
an operation setting unit that receives from a user and stores an input of operation settings relating to the operation of the image forming apparatus, and of web page display settings relating to web page display control on the display unit by the web browser function unit;
wherein upon start-up of the web browser function unit, the operation setting unit outputs the web page display settings to the web browser function unit, and the web browser function unit controls the display of the web page on the display unit according to the web page display settings,
the web browser function unit is configured to be replaceable in the image forming apparatus, and
upon start-up of the web browser function unit after replacement, the operation setting unit outputs the stored web page display settings to a web browser function unit after replacement, and the web browser function unit controls the display of the web page on the display unit according to the received web page display settings.

4. An image forming apparatus, comprising:
a display unit that displays an image;
a web browser function unit that causes the display unit to display a web page; and
an operation setting unit that receives from a user and stores an input of operation settings relating to the operation of the image forming apparatus, and of web page display settings relating to web page display control on the display unit by the web browser function unit;
wherein upon start-up of the web browser function unit, the operation setting unit outputs the web page display settings to the web browser function unit, and the web browser function unit controls the display of the web page on the display unit according to the web page display settings,
the web browser function unit comprises a web page display setting reception unit that receives an input of the web page display settings from the user, and when the web page display setting reception unit receives and stores an input for modifying the web page display settings from the user, the input is validated only for the web browser function unit running at that time, and the input is invalidated when the web browser function unit running at that time is closed.

5. An image forming apparatus, comprising:
a display unit that displays an image;
a web browser function unit that causes the display unit to display a web page; and
an operation setting unit that receives from a user and stores an input of operation settings relating to the operation of the image forming apparatus, and of web page display settings relating to web page display control on the display unit by the web browser function unit;
wherein upon start-up of the web browser function unit, the operation setting unit outputs the web page display settings to the web browser function unit, and the web browser function unit controls the display of the web page on the display unit according to the web page display settings,
the web browser function unit comprises a web page display setting reception unit that receives an input of the web page display settings from the user, and when the web page display setting reception unit receives an input for modifying the web page display settings from the user, the web page display setting reception unit stores the modified web page display settings such that the web page display settings, for which the input is received, are validated only for the web browser function unit running at the time that the input is received, and when the web browser function unit running at that time is closed, the web page display settings stored in the web page display setting reception unit are deleted,
a state, in which only web page display settings for which an input is received from the user by the operation setting unit are stored, is maintained in the operation setting unit, and
upon new start-up of the web browser function unit, the operation setting unit outputs the web page display settings, received from the user and stored, to the newly started-up web browser function unit, and the web browser function unit controls the display of the web page on the display unit according to the received web page display settings.

6. A non-transitory computer-readable medium which stores an operation control program for causing a computer, built into an image forming apparatus, to function as:
   a web browser function unit that causes a display unit of the image forming apparatus to display a web page;
   an operation setting unit that receives from a user and stores an input of operation settings relating to the operation of the image forming apparatus, and of web page display settings relating to web page display control on the display unit by the web browser function unit;
   and to function in such a manner that, upon start-up of the web browser function unit, the operation setting unit outputs the web page display settings to the web browser function unit; and the web browser function unit controls the display of the web page on the display unit according to the web page display settings the computer-readable medium further causing the computer to function as a display control unit in such a manner that the display control unit causes the display unit to display an initial settings screen including a first initial settings button and a second initial settings button when receiving a display instruction input of the initial settings screen from the user in the display of an initial screen on the display unit, causes the display unit to display a screen for inputting initial settings of the operation settings when the first initial settings button is pressed, and causes the display unit to display a screen for inputting initial settings of the web page display settings when the second initial settings button is pressed.

* * * * *